(12) United States Patent
Gruber et al.

(10) Patent No.: US 9,951,626 B2
(45) Date of Patent: Apr. 24, 2018

(54) NOISE ATTENUATION IN ROTATING BLADES

(71) Applicant: ROLLS-ROYCE PLC, London (GB)

(72) Inventors: Mathieu Gruber, Southampton (GB);
Philip Joseph, Southampton (GB);
Mahdi Azarpeyvand, Bristol (GB)

(73) Assignee: ROLLS-ROYCE plc, London (GB)

( * ) Notice: Subject to any disclaimer, the term of this patent is extended or adjusted under 35 U.S.C. 154(b) by 325 days.

(21) Appl. No.: 14/365,135

(22) PCT Filed: Dec. 13, 2012

(86) PCT No.: PCT/EP2012/075366
§ 371 (c)(1),
(2) Date: Jun. 13, 2014

(87) PCT Pub. No.: WO2013/092368
PCT Pub. Date: Jun. 27, 2013

(65) Prior Publication Data
US 2014/0377077 A1 Dec. 25, 2014

(30) Foreign Application Priority Data
Dec. 19, 2011 (GB) .................................. 1121753.6

(51) Int. Cl.
*F01D 5/14* (2006.01)
*F03D 1/06* (2006.01)

(52) U.S. Cl.
CPC ........... *F01D 5/141* (2013.01); *F03D 1/0675* (2013.01); *F05B 2240/122* (2013.01);
(Continued)

(58) Field of Classification Search
CPC ... F01D 5/12; F01D 5/14; F01D 5/141; F01D 5/145; F04D 29/18; F04D 29/181;
(Continued)

(56) References Cited

U.S. PATENT DOCUMENTS 4,089,618 A * 5/1978 Patel ..................... F04D 29/668
416/228
4,650,138 A * 3/1987 Grose ..................... B64C 21/10
138/38

(Continued)

FOREIGN PATENT DOCUMENTS

CN 102162464 A 8/2011
DE 10 2008 037 368 A1 4/2009
(Continued)

OTHER PUBLICATIONS

International Search Report issued in International Patent Application No. PCT/EP2012/075366 dated Feb. 13, 2013.
(Continued)

*Primary Examiner* — Richard Edgar
(74) *Attorney, Agent, or Firm* — Oliff PLC

(57) ABSTRACT

A blade for a rotating machine, particularly for a gas turbine engine, has a leading edge and a trailing edge joined by pressure and suction surfaces. The trailing edge has a serrated form including a first periodic variation and a second periodic variation of higher frequency and lower amplitude than the first periodic variation.

14 Claims, 6 Drawing Sheets

(52) U.S. Cl.
CPC .. *F05D 2240/122* (2013.01); *F05D 2240/304* (2013.01); *F05D 2250/18* (2013.01); *F05D 2250/181* (2013.01); *F05D 2250/182* (2013.01); *F05D 2250/183* (2013.01); *F05D 2250/184* (2013.01); *F05D 2250/191* (2013.01); *F05D 2260/961* (2013.01); *Y02E 10/721* (2013.01)

(58) Field of Classification Search
CPC .... F04D 29/183; F04D 29/22; F04D 29/2272; F04D 29/2261; F04D 29/24; F04D 29/242; F04D 29/26; F04D 29/28; F04D 29/281; F04D 29/30; F04D 29/32; F04D 29/321; F04D 29/325; F04D 29/38; F04D 29/384; F03D 1/00; F03D 1/06; F03D 1/0608; F03D 1/0633; F03D 7/0296
USPC ....................................................... 416/228
See application file for complete search history.

(56) References Cited

U.S. PATENT DOCUMENTS

| | | | |
|---|---|---|---|
| 5,386,955 A * | 2/1995 | Savill | B63B 1/34 138/38 |
| 5,533,865 A | 7/1996 | Dassen et al. | |
| 6,733,240 B2 * | 5/2004 | Gliebe | F01D 5/141 416/228 |
| 8,267,657 B2 * | 9/2012 | Huck | F03D 80/00 416/228 |
| 8,794,927 B2 * | 8/2014 | Vassilicos | F15D 1/10 416/228 |
| 2009/0074585 A1 | 3/2009 | Koegler et al. | |
| 2010/0143151 A1 * | 6/2010 | Kinzie | F03D 1/0675 416/248 |

FOREIGN PATENT DOCUMENTS

| | | | | |
|---|---|---|---|---|
| JP | A-2003-336572 | 11/2003 | | |
| WO | WO 2011/157849 A2 | 12/2011 | | |
| WO | WO 2011157849 A2 * | 12/2011 | ........... | F03D 1/0675 |
| WO | WO 2012/042245 A1 | 4/2012 | | |

OTHER PUBLICATIONS

Written Opinion issued in International Patent Application No. PCT/EP2012/075366 dated Feb. 13, 2013.
Search Report issued in British Patent Application No. 1121753.6 dated Apr. 5, 2012.

* cited by examiner

NOISE ATTENUATION IN ROTATING BLADES

This invention relates to blades in rotating machines, and more particularly, though not exclusively, to noise attenuation in such blades in gas turbine engines.

Various components of gas turbine engines produce noise in operation. One such source of noise is the trailing edges of rotating blades, where the interaction of boundary layer turbulence with the blade trailing edge produces a noise commonly referred to as trailing edge self-noise (TESN). Such noise generally has components over a wide range of frequencies and is therefore an example of broadband noise.

TESN is a particular problem in the design of fan blades in gas turbine engines, wind turbines, cooling fans and similar machines. It is believed that it is one of the dominant sources of fan broadband noise in such applications.

It is known to provide serrations of saw-toothed form on the trailing edges of blades to address the problem of self-noise. The serrations promote a reduction in the scattering of sound at the trailing edge. In addition, it has been shown experimentally that, in the close vicinity of the trailing edge, the peak of turbulence in the boundary layer is pushed away from the edge. This is believed to contribute to the noise reduction by reducing the strength of the sources distributed along the wetted edges.

Such serrations have been found to be moderately effective at reducing TESN in rotating blades.

However, their noise reduction effectiveness has been found to be highly sensitive to misalignment of the serrations with the flow direction. Such misalignment can result in noise levels even higher than for untreated blades, especially at higher frequencies. Even when the serrations are optimally aligned, the introduction of trailing edge serrations has been shown to cause a significant increase in noise at higher frequencies. This is believed to be due to a cross flow phenomenon between the teeth of the serrations. Small jets radiate noise in the higher frequency range, where trailing edge noise becomes weaker.

The invention provides a blade with a novel trailing edge geometry that significantly reduces the generation of TESN, especially at higher frequencies.

According to the invention, there is provided a blade for a rotating machine as set out in the claims.

Embodiments of the invention will now be described, by way of example, with reference to the accompanying drawings in which FIG. 1 shows (not to scale) a single tooth of a known serrated trailing edge;

FIG. 5 shows the overall sound power reduction levels (compared with an untreated trailing edge) at a flow velocity of 40 ms$^{-1}$ and for various geometrical angles of attack between 0° and +15°, for conventionally serrated trailing edges and for a trailing edge with serrations according to one embodiment of the invention; and FIG. 6 shows three examples of trailing edges with serrations according to further embodiments of the invention.

Figure 1:
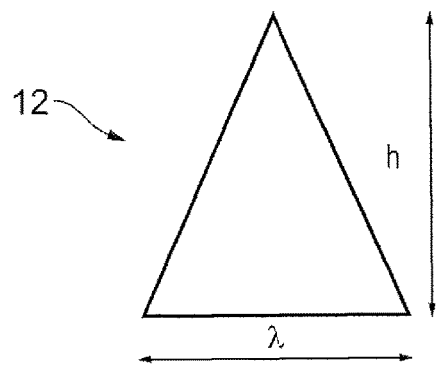

FIG. 1 shows (not to scale) a single tooth 12 from a known serrated trailing edge. in this embodiment, the height h of the tooth is 30 mm and the width λ is 9 mm.

Figure 2:
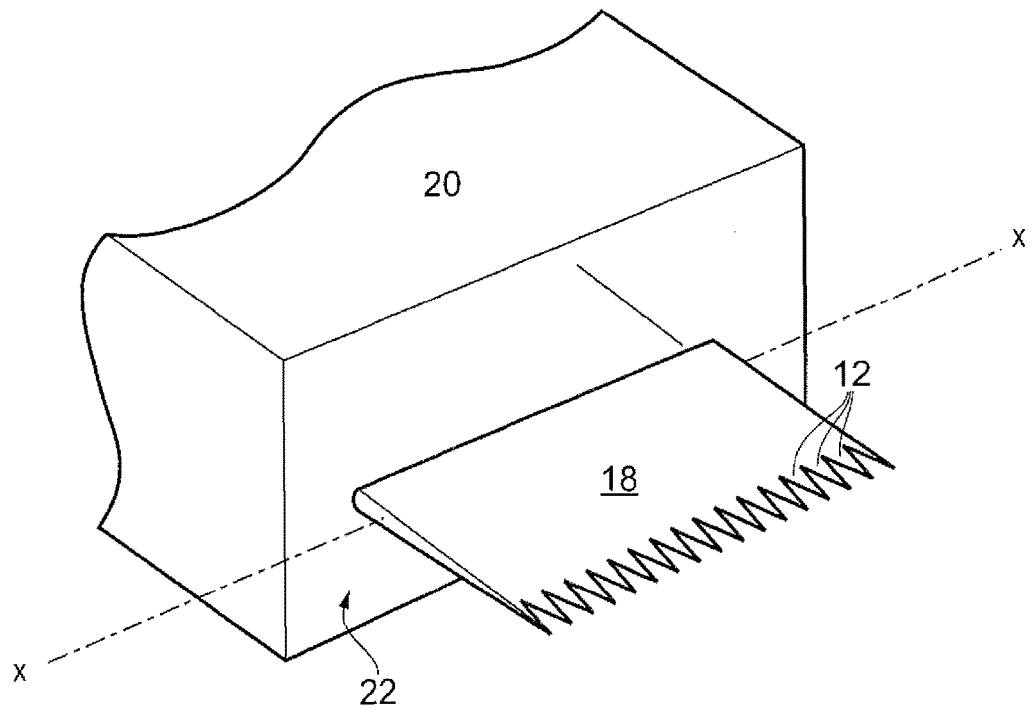
FIG. 2 shows an aerofoil blade, with a serrated trailing edge formed of teeth as shown in FIG. 1, mounted in a wind tunnel.

Referring to FIG. 2, in order to determine the effects of these known teeth 12 on blade performance, a number of teeth 12 were mounted to the trailing edge of an aerofoil blade 18 with a chord length of 130 mm, so as to give rise to a periodic variation in the local effective chord length. Taking total surface area into account, the effective chord length of the blade 18 was 155 mm. The span of the blade was 450 mm. The teeth 12 were mounted so as to abut one another, so that the spatial periodicity of the serration in the spanwise direction was λ. This serration pattern will be referred to as "large serrated".

FIG. 2 shows the blade 18 mounted in a wind tunnel. The wind tunnel has a duct 20 defining a nozzle 22 through which an air flow can be delivered. In terms of the air flow over the blade, either in the wind tunnel or when installed in a gas turbine engine, the "height" dimension h of the teeth is therefore substantially parallel to the air flow direction and the "width" dimension λ is substantially perpendicular to the air flow direction. The blade 18 is pivotable about an axis X-X so that its angle of attack can be altered.

The blade 18 was tested in the wind tunnel by subjecting it to airflows at different speeds and angles of attack, and the noise generated by these airflows was measured by measuring devices of known type (not shown in the drawings).

It is known that the noise reduction delivered by a "large serrated" trailing edge can be improved by altering the dimensions of the serrations. In a particular embodiment of a "large serrated" trailing edge (not shown in the drawings) the height h of the serrations is 30 mm, as in FIG. 1, but their width (and, therefore, the spatial periodicity) λ is 1.5 mm. This geometry has been shown to be (within the constraints of the manufacturing process used) the optimal configuration for a known serrated trailing edge, and will be referred to as "sharp serrated".

Figure 3:
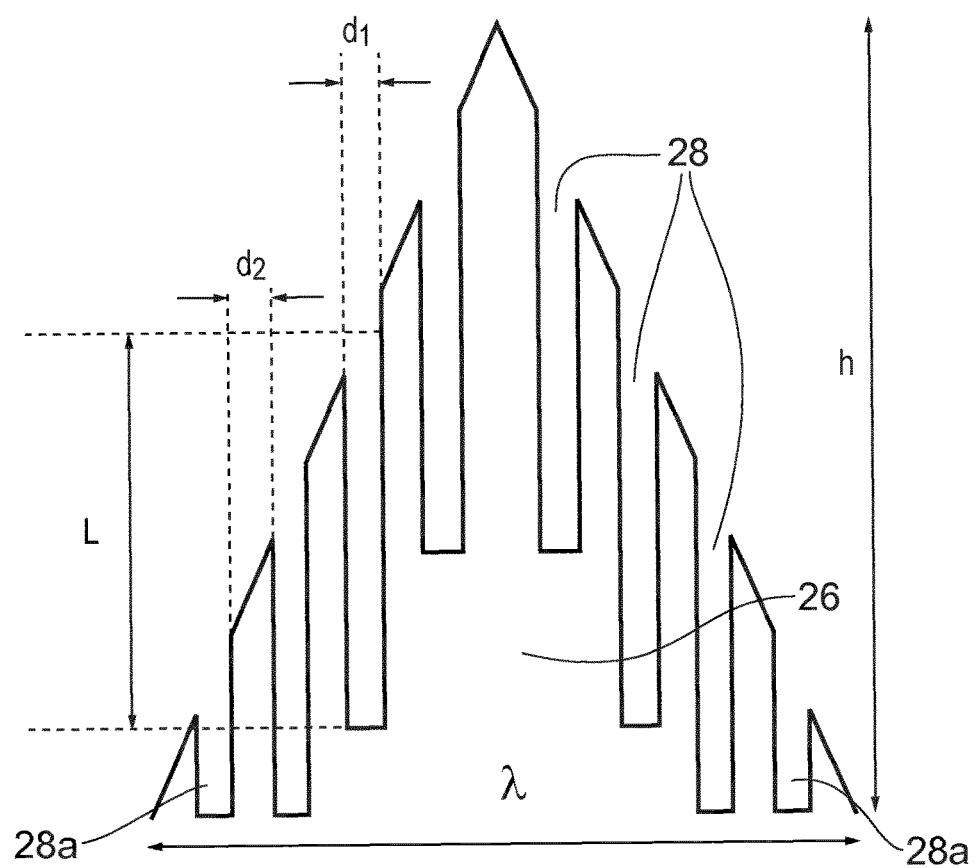
FIG. 3 shows (not to scale) a single tooth of a serrated trailing edge according to one embodiment of the invention.

FIG. 3 shows (not to scale) a single tooth 26 from a serrated trailing edge according to one aspect of the invention. The overall height h and width λ of the tooth are the same as for the tooth of FIG. 1, 30 mm and 9 mm respectively in this embodiment. This form of trailing edge will be referred to as "slitted-serrated".

The tooth of FIG. 3 has a number of slits 28. These extend substantially parallel to the direction of the air flow in use. The width $d_1$ of each slit is 0.5 mm, and the lateral spacing $d_2$ between adjacent slits is 0.5 mm. The depth L of each slit is 22.5 mm. The slits 28a are truncated because they are near to the bottom of the tooth, and so their depth is less.

In general terms, the "slitted-serrated" blade therefore provides a trailing edge geometry in which a lower-frequency, higher-amplitude periodic variation (as in the known "large serrated" trailing edge) is combined with a higher-frequency, lower amplitude periodic variation (the slits). The combination of the two periodic variations delivers better noise reduction than known trailing edges, both at lower and higher frequencies.

In the same manner as described previously, a number of teeth as shown in FIG. 3 were mounted to the trailing edge of an aerofoil with a chord length of 130 mm, so that the effective chord length was 155 mm. The span of the blade was 450 mm. This "slitted-serrated" trailing edge was tested in the wind tunnel in the same way as before.

Figure 4A:
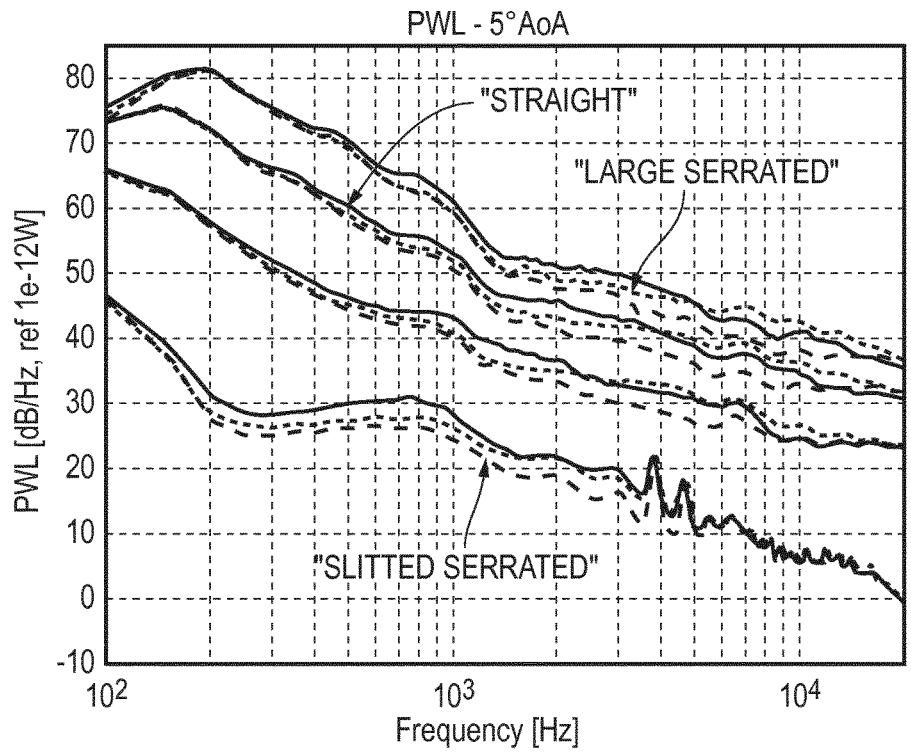
FIG. 4a shows a comparison of the sound power level spectra for an untreated trailing edge, a conventionally serrated (as shown in FIG. 1) trailing edge and a trailing edge with serrations (as shown in FIG. 3) according to one embodiment of the invention.

Referring now to FIG. 4a, this shows a comparison between the sound power spectra for the different trailing edges. The sound power spectrum is calculated assuming cylindrical noise radiation to the far field, over a polar angle of 65° in the aerofoil mid-span plane. Comparing, firstly, the "large serrated" trailing edge (long dashes) against the "straight", unserrated, trailing edge (solid line), it can be seen that at lower frequencies (between about 100 Hz and 500 Hz) the noise radiation is dominated by jet noise and no reduction occurs because of the serration. Between about 500 Hz and 5 kHz the serrated trailing edge reduces the generated noise compared with a "straight" trailing edge. At frequencies higher than about 5 kHz, however, the noise level from the large serrated trailing edge is generally significantly higher (by as much as 5 dB at some frequencies) than from the "straight" trailing edge.

Comparing, secondly, the "large serrated" trailing edge (long dashes) against the "slitted-serrated" trailing edge as shown in FIG. 3 (short dashes) it can be seen that both these trailing edges reduce the noise by a similar amount at lower frequencies, below about 1 kHz (compared with the "straight" trailing edge). However, in contrast to the known "large serrated" trailing edge, the "slitted-serrated" trailing edge generally also delivers a reduction in noise at higher frequencies, with any increase in noise—compared with the "straight" trailing edge—being relatively small (less than about 1 dB).

Figure 4B:
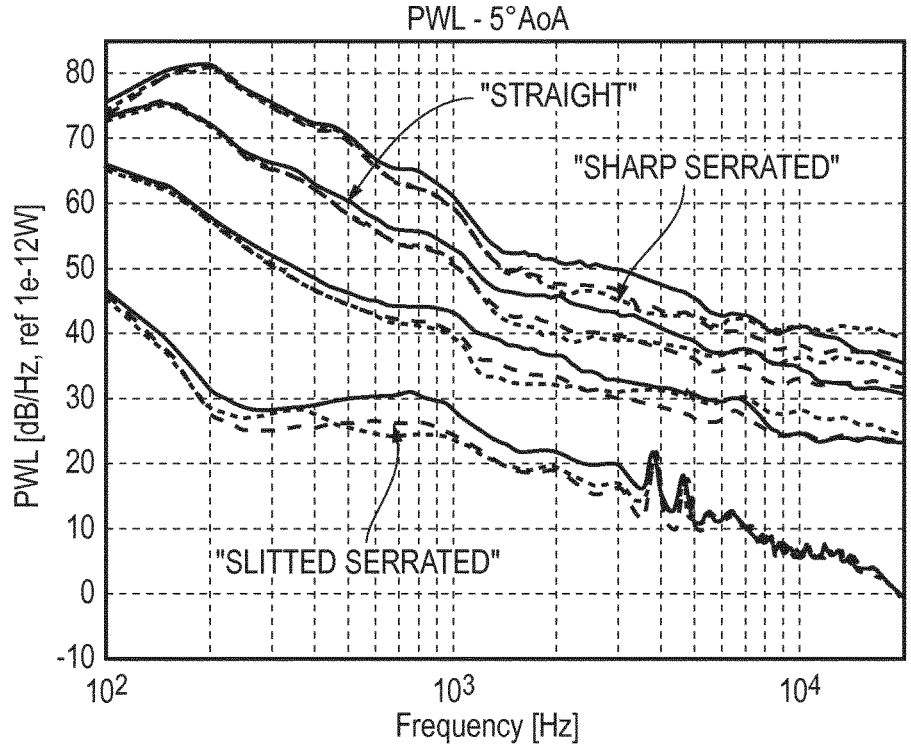
FIG. 4b shows a similar comparison to FIG. 4a, in which the conventionally serrated trailing edge has serrations with their dimensions selected to optimise noise reduction.

Referring to FIG. 4b, it can be seen that although the "sharp serrated" trailing edge generates less noise at most frequencies than the "large serrated", it still has the same characteristics described above, with noise reduction (compared against a "straight" trailing edge) at lower frequencies offset by an increase in noise at higher frequencies. The conventional "large serrated" trailing edge cannot, therefore, reduce higher-frequency noise even when its geometry is optimised. In contrast, the "slitted-serrated" trailing edge generally produces no increase in noise at these higher frequencies.

Figure 5A:
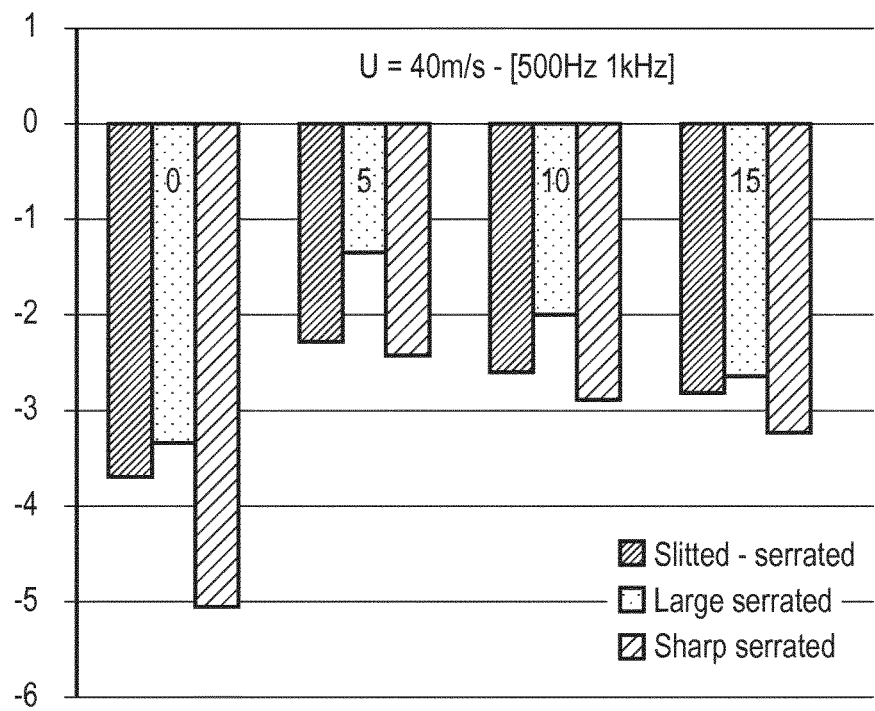
Figure 5B:
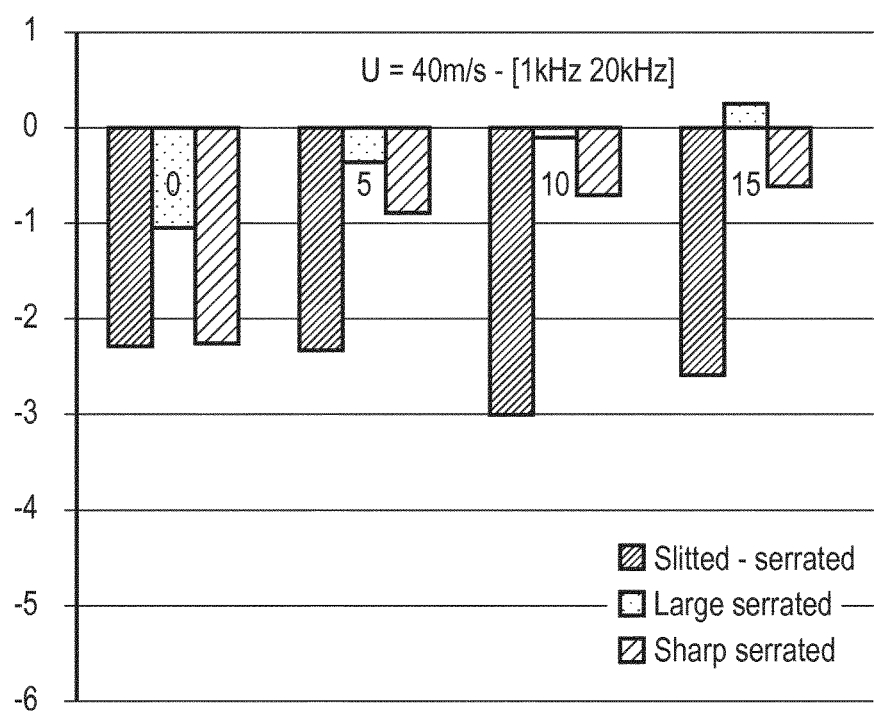

FIG. 5 shows the overall sound power reduction levels, for "large serrated", "sharp serrated" and "slitted-serrated" trailing edges, for a flow velocity of 40 ms$^{-1}$, for various angles of attack between 0° and +15°. FIG. 5a shows the average reduction for the frequency range 500 Hz to 1 kHz, and FIG. 5b shows the average reduction for the frequency range 1 kHz to 20 kHz.

It can be seen from FIG. 5a that the three trailing edge treatments deliver broadly comparable noise reductions at lower frequencies. It is clear from FIG. 5b, however, that the "slitted-serrated" trailing edge delivers significantly better noise reduction for higher frequencies, one of the striking features being the consistency of the noise reduction with varying angle of attack.

It is believed that two mechanisms combine to deliver the improved noise reduction of the "slitted-serrated" trailing edge. Firstly, a reduced scattering efficiency of the boundary layer vorticity due to an increase in the total integrated length of the trailing edge; and secondly, a reduced cross-flow through the serration roots due to a lessening of the steady pressure difference across the trailing edge by the introduction of the slits, which allow communication of the steady and unsteady pressures across the trailing edge.

To achieve the optimum noise reduction, the relationship between the dimensions of the lower- and higher-frequency serrations must be understood and optimised. The following specific criteria have been found to be important for a "slitted-serrated" trailing edge.

Firstly, in order for the "slitted-serrated" trailing edge to significantly reduce the trailing edge noise, both parameters $d_1$, $d_2$ must be much less than $\delta$, and L must be much greater than $\delta$, where $\delta$ is the boundary layer thickness.

Secondly, for maximum noise reduction $d_1$ should be equal to $d_2$.

Thirdly, as for the "large serrated" trailing edge, $\lambda$ should be less than $\delta$ and h should be greater than $\delta$.

It will be appreciated that other many arrangements of "slitted-serrated" trailing edge may be devised that meet these criteria and deliver the advantages of the invention. Furthermore, it will be appreciated that the underlying principle of the invention, in which a lower-frequency, higher-amplitude periodic variation of the trailing edge is combined with a higher-frequency, lower-amplitude periodic variation, may be applied to produce many different configurations of trailing edge. FIG. 6 shows a small number of examples of possible alternative embodiments of a trailing edge according to the invention.

Figure 6A:
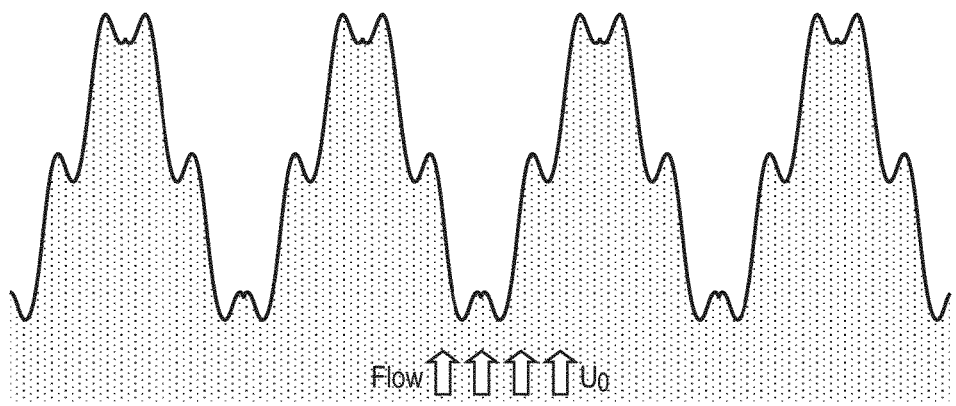

In FIG. 6a, both the lower-frequency and higher-frequency periodic variations of the trailing edge are sinusoidal.

Figure 6B:
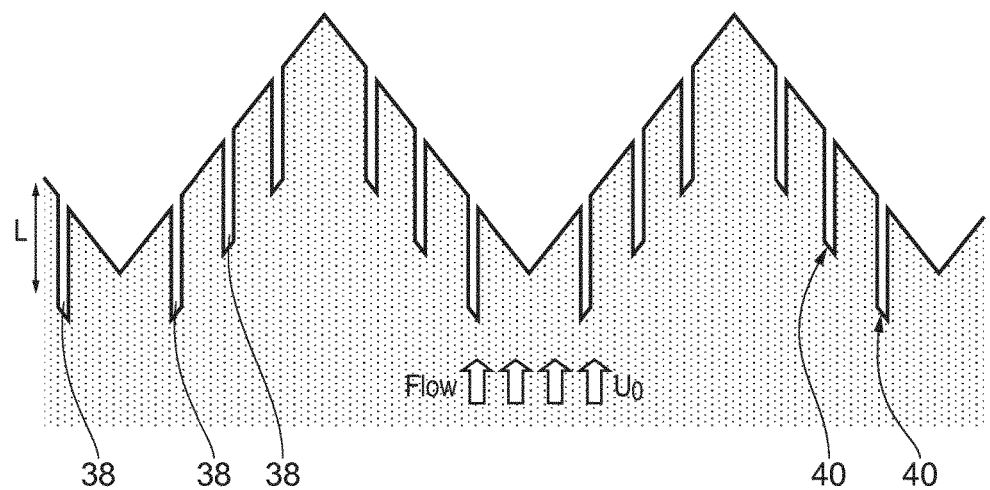

In FIG. 6b, the lower-frequency periodic variation is provided by a serration, with teeth similar to those in FIG. 1. The higher-frequency periodic variation is provided by slits 38. In contrast to the arrangement of FIG. 3, all the slits 38 have the same depth L (none are truncated) and the bottom 40 of each slit is angled to be parallel to the wetted edge of the lower-frequency serration. As in the embodiment of FIG. 3, it is important that the three criteria set out above are still met.

Figure 6C:
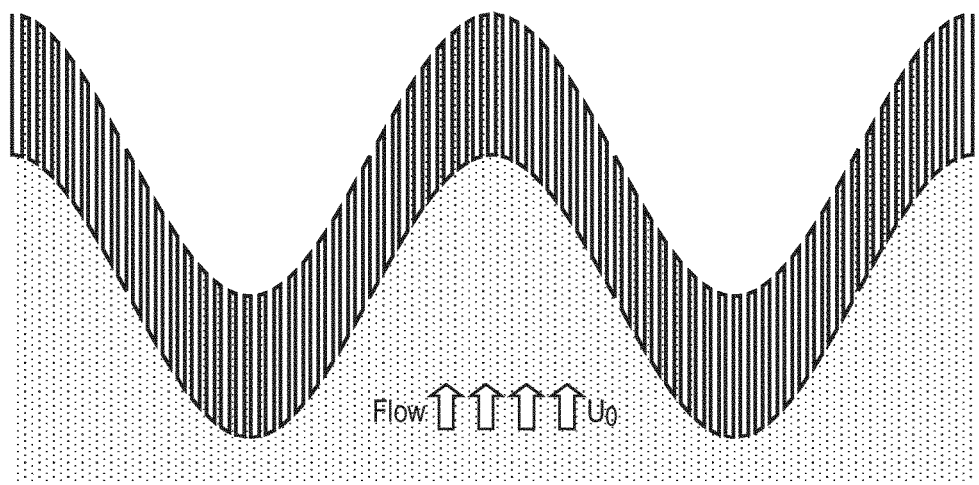

In FIG. 6c, (higher-frequency) slits are superimposed on a (lower-frequency) sinusoidal trailing edge. These slits, like those in FIG. 6b, are of uniform depth and with their bottoms angled to match the shape of the sinusoidal edge.

In a further alternative embodiment of the invention (not shown in the drawings), the same effects could be achieved by the introduction of a number of small holes in the vicinity of the serrated (or sinusoidal) trailing edge. Alternatively, the trailing edge region of the blade could be made from a porous material with an appropriate flow resistance.

The invention therefore provides a blade with novel trailing edge geometry, which delivers significantly lower noise than known blades especially at higher frequencies.

It is anticipated that the benefits of the invention could be realised with other trailing edge geometries, relying on the two mechanisms described above.

Slits or similar smaller-scale periodic variations of the trailing edge may be combined with any known serration geometry, for example asymmetric or trapezoidal serrations.

The invention claimed is:

1. A blade for a rotating machine, the blade having a leading edge and a trailing edge joined by pressure and suction surfaces, the trailing edge having a serrated form comprising a first periodic variation that defines a profile,
   wherein a region of the trailing edge has a second periodic variation of higher frequency and lower amplitude than the first periodic variation, and
   wherein the second periodic variation is defined only by elongated gaps that extend from the profile of the first periodic variation into the blade.

2. The blade as claimed in claim 1, wherein the first periodic variation and the second periodic variation give rise to corresponding periodic variations in a local effective chord length of the blade.

3. The blade as claimed in claim 1, wherein the first periodic variation is a sawtooth shape.

4. The blade as claimed in claim 1, wherein the first periodic variation is sinusoidal.

5. The blade as claimed in claim 1, wherein a spatial periodicity of the first periodic variation is about 9 mm.

6. The blade as claimed in claim 1, wherein an amplitude of the first periodic variation is about 30 mm.

7. The blade as claimed in claim 1, wherein a depth of the elongated gaps is about 22.5 mm.

8. The blade as claimed in claim 1, wherein a width of the elongated gaps is about 0.5 mm.

9. The blade as claimed in claim 1, wherein a lateral spacing of the elongated gaps is about 0.5 mm.

10. The blade as claimed in claim 1, wherein the trailing edge is formed with low frequency serrations, and the elongated gaps are formed from elongated gaps provided in the low frequency serrations.

11. The blade as claimed in claim 1, wherein each of the elongated gaps extends in a direction parallel to airflow past the blade when the blade is in operation.

12. A gas turbine engine comprising a fan having a plurality of fan blades, each fan blade having a leading edge and a trailing edge joined by pressure and suction surfaces, the trailing edge having a serrated form comprising only a first periodic variation and a second periodic variation, wherein the second periodic variation is of higher frequency and lower amplitude than the first periodic variation, and the second periodic variation is defined by elongated gaps extending inward from the trailing edge toward the leading edge, the elongated gaps all extending in a direction parallel to airflow through the fan when the fan rotates.

13. The gas turbine engine according to claim 12, wherein the fan is configured to rotate such that a boundary layer of flow develops over the blade, and wherein the elongated gaps have a width and lateral spacing less than the thickness of a boundary layer of flow over the blade at cruise, and the elongated gap has a depth that is greater than the thickness of a boundary layer of flow of the blade at cruise.

14. A gas turbine engine comprising:

a fan having a plurality of fan blades, each fan blade having a leading edge and a trailing edge joined by pressure and suction surfaces, the trailing edge having a serrated form comprising only a first periodic variation and a second periodic variation, wherein the second periodic variation is of higher frequency and lower amplitude than the first periodic variation, and the second periodic variation is defined by elongated gaps in the trailing edge, the elongated gaps all extending in a direction parallel to airflow through the fan when the fan rotates, wherein a spatial periodicity of the first periodic variation is about 9 mm and an amplitude of the first periodic variation is about 30 mm, and wherein a depth of the elongated gaps is about 22.5 mm, a width of the elongated gaps is about 0.5 mm, and a lateral spacing of the elongated gaps is about 0.5 mm.

* * * * *